Patented Sept. 3, 1935

2,013,295

UNITED STATES PATENT OFFICE 2,013,295

DENTURE

John James Tidd, Ardrossan, Scotland, assignor to Imperial Chemical Industries Limited, a corporation of Great Britain No Drawing. Application September 9, 1933, Serial No. 688,827. In Great Britain September 15, 1932

9 Claims. (Cl. 106—22)

This invention relates to dentures, and more specifically to an improved denture base or plate of novel composition and having properties not available in previous articles of the kind.

In the manufacture of dental plates, a molding material having certain specific properties is required. The material must be hard, but not brittle, up to a temperature of 55–60° C. in order to withstand reasonable usage. It must be capable of being molded easily at a temperature between 105–140°. It must be non-toxic, and unaffected by saliva and such substances as are likely to be taken in the mouth. In addition it should be capable of easy repair if broken, and of being tinted to resemble closely the flesh color of the gums and palate.

Hitherto compositions containing rubber, and more recently nitrocellulose, have been used almost exclusively as dental plate materials. These materials are open to certain serious objections, however. Rubber plates are difficult, if not impossible, to repair and in addition, because it is relatively opaque, rubber cannot readily be tinted to match the delicate color of the human gums. Nitrocellulose plates, on the other hand, are objected to on account of taste and are not even so highly regarded as rubber.

I have now found that the resinous body obtained by polymerizing methyl methacrylate (methyl ester of alpha-methylacrylic acid) is especially well adapted for the making of dentures, dental plates of this material fulfilling to an unusual degree the requirements noted above.

Methyl methacrylate may conveniently be prepared according to the methods described in the Loder U. S. Application Ser. No. 593,411 and the copending British applications No. 22673/32 and No. 7354/33, or by treating methyl hydroxyisobutyrate with phosphorus trichloride, as indicated for the corresponding ethyl ester in Richter's Organic Chemistry, vol. 1, English Edition 1919. The methyl methacrylate may be polymerized by exposure to light or by heating with or without a catalyst such as the acyl peroxides, e. g. benzoyl peroxide.

The polymers obtained vary somewhat in hardness and thermoplastic properties, depending upon the polymerizing conditions, and especially upon whether a catalyst is used and what temperature is employed. In order, therefore, to make the molding stock adapted for a range of fabricating conditions, I have found it advisable to incorporate with the methyl methacrylate polymer a subordinate amount of a solvent therefor. In general the proportion of solvent which I use to obtain the desired properties of the plastic lies between 4 and 18 parts by weight for every 100 parts by weight of methyl methacrylate polymer. The requisites of the solvent are that it should have a solvent action upon the polymer at or below 140° C., thus facilitating the molding of the material at convenient working temperatures, and that it should be non-poisonous and of low volatility at the molding temperature. It should, furthermore, be very nearly or quite colorless, should be unaffected by saliva, and should not give rise to an unpleasant odor or taste. Many suitable materials are available, but I have found that non-toxic, high-boiling ethers of polyhydric alcohols, e. g. glycerol diphenyl ether, non-toxic high-boiling di-esters of phthalic acid, e. g. dibutyl phthalate, and non-toxic lower fatty acid esters of polyhydric alcohols, e. g. triacetin, and tripropionin, are particularly suitable substances.

It should be understood that the term "non-toxic" as used herein means innocuous under service conditions, and does not necessarily mean that, if the solvent were ingested per se in appreciable amounts, no poisoning would ensue.

The solvent may be incorporated with the polymer by working the ingredients on heated rolls, preferably at 80–100° C. or the incorporation of fragmental or comminuted polymer with solvent may be effected in a ball mill. I may also mix the solvent with the unpolymerized methyl methacrylate and then polymerize the latter in the mixture. This may be done by the action of heat, in the presence of an oxidizing catalyst such as benzoyl peroxide. Unless pigments are deliberately added, the material so obtained is perfectly colorless, provided due care has been taken to choose a solvent sufficiently free from color. Pigments and the like may be added, for instance, during the working of the material on hot rolls, during the ball mill treatment or prior to polymerization. It is found in general that the initial colorless nature of the plastic material greatly facilitates color matching, and that the colors obtained are permanent.

The material may conveniently be rolled into sheets of suitable size and thickness and may be molded into dental plates, e. g. at 120–140° C. and under a pressure of ½ to 1¼ tons per square inch.

The invention is illustrated by the following examples to which, however, it is not limited. The parts are by weight.

*Example 1.*—A solution of 10 parts of methyl methacrylate, 40 parts methyl alcohol, and 50 parts water is maintained at 65° C. in a closed vessel for four days. The polymer precipitates from solution as formed, yielding a finely divided spongy mass. The methanol-water solution is filtered off and the solid product washed with methanol, dried at room temperature for a few hours, and then dried at 140° C. for eight hours.

Ninety to eighty-five parts of the powdery polymer is placed in a ball mill with 10-15 parts triacetin, 0.1 part of titanium dioxide and 0.05 parts of cadmium red. The mill is rotated for about 24 hours, after which the powder is found to be substantially homogeneous. This powder, with or without previous compacting is pressed into a preformed shape in a suitable die at a temperature of about 125-140° C. and a pressure of about 1000 to 2000 pounds per square inch. From this preform or blank finished dentures can be molded at the temperatures and pressures just given.

Example 2.—Ninety parts of methyl methacrylate and 10 parts of the dibutyl phthalate of commerce (which is practically water-white) are mixed and heated in the presence of 0.5 part of ground benzoyl peroxide at 90-100° C. under reflux for three hours.

The colorless polymerized material, after removal from the containing vessel, is transferred to rolls heated to about 100° C. and worked with the addition of 0.25 part of vermilion and 0.16 part of titanium oxide until uniform dispersion of the pigments has been attained. The material is then pressed directly in a dental plate mold at 120-140° C. under a pressure of one ton per square inch.

The manipulative details of taking dental impressions and preparing the required molds therefrom are well known to those skilled in the art and have not been here described, the invention not being concerned specifically therewith.

It should be understood that while the novel polymerized methyl methacrylate dentures of the present invention have hereinbefore been illustrated by certain examples of proportions of ingredients and methods for the compounding and molding thereof, other ingredients than those specifically named may alternatively or additionally be included.

Various other changes may be made in the details hereinbefore described without departing from the invention or sacrificing the advantages thereof.

I claim:

1. As a new article a denture comprising polymerized methyl methacrylate.

2. As a new article a denture comprising heat-molded methyl methacrylate polymer.

3. As a new article a denture comprising polymerized methyl methacrylate and a solvent therefor, said solvent being substantially tasteless, odorless, and non-toxic and relatively non-volatile up to 120° C.

4. As a new article a denture comprising polymerized methyl methacrylate and a non-toxic lower fatty acid ester of a polyhydric alcohol.

5. As a new article a denture comprising polymerized methyl methacrylate and triacetin.

6. A denture as in claim 3 containing between 4 and 18 parts by weight of solvent per 100 parts of polymerized methyl methacrylate.

7. Process of making a denture comprising mixing together 100 parts of polymerized methyl methacrylate, 4-18 parts of a solvent therefor, said solvent being substantially tasteless, odorless, and non-toxic, and relatively non-volatile up to 120° C., and pigment, until a homogeneous product is obtained, and then molding said product in a dental plate mold at a temperature of 120-140° C. and a pressure of ½ to 1¼ tons per square inch.

8. Process of making a denture comprising mixing together 100 parts of polymerized methyl methacrylate, 4-18 parts of a solvent therefor from the group consisting of glyceryl diphenyl ether, di-alkyl phthalate, triacetin, and tripropionin, and pigment, until a homogeneous product is obtained, and then molding said product in a dental plate mold at a temperature of 120-140° C. and a pressure of ½ to 1¼ tons per square inch.

9. Process of making a denture comprising milling 85-90 parts of precipitated methyl methacrylate polymer, 10-15 parts of triacetin, and pigment, until a homogeneous product is obtained, and then molding said product in a dental mold at a temperature of 125-140° C. and a pressure of 1000-2000 pounds per square inch.

JOHN JAMES TIDD.